(12) United States Patent
Rosenstrom

(10) Patent No.: US 6,598,734 B1
(45) Date of Patent: Jul. 29, 2003

(54) VIBRATORY DISTRIBUTION CONVEYOR

(75) Inventor: Bo Richard Rosenstrom, Louisville, KY (US)

(73) Assignee: Carrier Vibrating Equipment, Inc., Louisville, KY (US)

( * ) Notice: Subject to any disclaimer, the term of this patent is extended or adjusted under 35 U.S.C. 154(b) by 0 days.

(21) Appl. No.: 10/219,736

(22) Filed: Aug. 15, 2002

(51) Int. Cl.$^7$ ............................................... B65G 27/20
(52) U.S. Cl. ...................................... 198/770; 198/758
(58) Field of Search ................................ 198/758, 759, 198/761, 766, 770, 771

(56) References Cited

U.S. PATENT DOCUMENTS

| | | | | |
|---|---|---|---|---|
| 3,053,379 A | * | 9/1962 | Roder et al. ................ 198/770 |
| 4,015,705 A | * | 4/1977 | Dumbaugh ................. 198/770 |
| RE29,512 E | * | 1/1978 | Musschoot ................. 198/770 |
| 5,064,053 A | | 11/1991 | Baker | |
| 5,265,730 A | * | 11/1993 | Norris et al. ........... 198/770 X |
| 5,407,060 A | * | 4/1995 | Kreft ........................... 198/763 |
| 5,615,763 A | | 4/1997 | Schieber | |
| 5,816,386 A | * | 10/1998 | Carlyle ................... 198/761 X |
| 6,112,883 A | | 9/2000 | Kraus et al. | |
| 6,145,652 A | * | 11/2000 | Durnil ..................... 198/770 X |

* cited by examiner

Primary Examiner—James R. Bidwell
(74) Attorney, Agent, or Firm—Stites & Harbison, PLLC; David W. Nagle, Jr.

(57) ABSTRACT

A vibratory conveyor has an eccentric shaft drive system mounted at an angle relative to horizontal plane defined by the conveyor deck. Rotation of the drive shafts and associated eccentric weight elements causes a net force to be imparted to the conveyor deck at an angle relative to horizontal plane defined by the deck to convey material forward. The drive shafts are mounted and controlled such that changing the phase angle between the respective drive shafts causes a change in direction of the net force output of the drive system, thereby resulting in a directional or sideways conveying motion.

17 Claims, 15 Drawing Sheets

VIBRATORY DISTRIBUTION CONVEYOR

BACKGROUND OF THE INVENTION

The present invention relates to vibratory conveying equipment for moving bulk material, and, more particularly, to a vibratory distribution conveyor that allows for the distribution of conveyed materials at different locations along the length of the conveyor deck.

Vibratory conveyors are well known is the art and are commonly used for moving bulk materials. One type of common vibratory conveyor is a brute force conveyor, in which a force is imparted to the material-carrying deck at an angle relative to horizontal plane defined by the deck so that the material moves with the deck along this angle. Once the force is reversed, the deck moves in the reverse direction, allowing the material to fall to the deck in a more forward position. An eccentric shaft drive system is generally used to impart the requisite cyclical force to the deck, which is mounted to a stationary support through a plurality of elastic members such as springs. The eccentric shaft drive system comprises one or more rotating shafts and associated weights so as to impart the cyclical resultant force to the vibratory deck. In simple terms, the conveyed material is essentially "bounced" along the deck from an inlet end to a discharge end. Thus, through much of its travel, the conveyed material is airborne, and the material actually contacts the deck only long enough to be re-launched into the air in the direction of the.discharge end of the deck.

In any event, there are some applications in which it would be preferable to distribute the conveyed material at different locations along the length of the conveyor deck, rather than solely at the discharge end. For example, U.S. Pat. No. 6,112,883 issued to Kraus, et al. and assigned to General Kinematics of Barrington, Ill. describes a vibratory distribution conveyor that includes a means for controlling declination of the deck about an axis extending from the inlet end to the discharge end so as to distribute conveyed materials over the side or distribution edge of the deck 22. Specifically, there is a pivotable connection between the planar conveying surface of the deck and a frame member disposed below the deck to accommodate pivoting movement of the deck about the longitudinal axis extending from the inlet end to the discharge end. As for the declination controlling means, an inflatable and deflatable bag is positioned below the deck on the side opposite of a distribution edge to control the angle of declination of the deck relative to the longitudinal axis. By controlling the inflation and deflation of the bag, the deck can be oriented to cause materials to conveyed, under the force of gravity, off of the deck along the distribution edge.

However, such a construction of a vibratory distribution conveyor is substantially complex, requiring not only an appropriate control system for the eccentric shaft drive system, but also requiring a control system for the declination equipment. Furthermore, air bellows or inflatable bags and rubber torsion springs are subject to rapid wear and require frequent maintenance.

It is therefore a paramount object of the present invention to provide a vibratory distribution conveyor that allows for the distribution of conveyed material at different locations along the length of the conveyor deck, rather than solely at the discharge end, but without the inherent mechanical and control complexities associated with manipulating the declination of the conveyor deck.

This and other objects and advantages of the present invention will become apparent upon a review of the following description and appended claims.

SUMMARY OF INVENTION

The present invention is a vibratory conveyor that allows for the distribution of conveyed material at different locations along the length of the conveyor deck, rather than solely at the discharge end, but without the necessity of controlling declination of the conveyor deck.

A preferred vibratory conveyor made in accordance with the present invention has a frame that is mounted to a stationary base by a plurality of isolating springs. The frame of the vibratory conveyor comprises a lower housing and an upper deck. The lower housing is mounted to the stationary base and encloses an eccentric weight drive system. The upper deck is a generally horizontal conveying surface that is secured to the lower housing.

The preferred eccentric shaft drive system includes a pair of counter-rotating drive shafts, each such shaft carrying eccentric weights. The first and second drive shafts are interposed between and rotatably mounted to inner support walls of the lower housing and supported by respective bearings, such that the eccentric shaft drive system is mounted at an angle relative to horizontal plane defined by the conveyor deck. Each drive shaft is independently driven by a motor through a belt and pulley arrangement. Rotation of the drive shafts and associated eccentric weight elements causes a net force to be imparted to the conveyor deck at an angle relative to horizontal plane defined by the deck to convey material forward. However, the drive shafts are mounted and controlled such that changing the phase angle between the respective drive shafts causes a change in direction of the net force output of the drive system, thereby resulting in a directional or sideways conveying motion.

To accomplish the requisite control of the phase angle relationship between the respective drive shafts, a sensor or proximity switch is located adjacent each of the drive shafts for sensing the position of each shaft. Signals representing the respective positions of the drive shafts are then provided to a controller, which, in response to the time sequence or value thereof, generates a real-time phase angle signal corresponding to the relative phase angle difference between the two drive shafts. The controller then compares the value of the real-time phase angle signal to a predetermined phase angle signal representing the desired direction of the resultant force. The controller then provides a signal to a variable frequency drive to cause it to continuously adjust the speed of one or both of the motors until the real-time phase angle signal approximates the predetermined, programmed value. Through control of the motors in this manner, the phase angle between the respective drive shafts can be changed, thereby causing a change in direction of the net force output of the drive system, and resulting in a directional or sideways conveying motion. Distribution of conveyed material at different locations along the length of the conveyor deck is therefore possible without the necessity of controlling declination of the conveyor deck.

DETAILED DESCRIPTION OF THE PRESENT INVENTION

Figure 1:
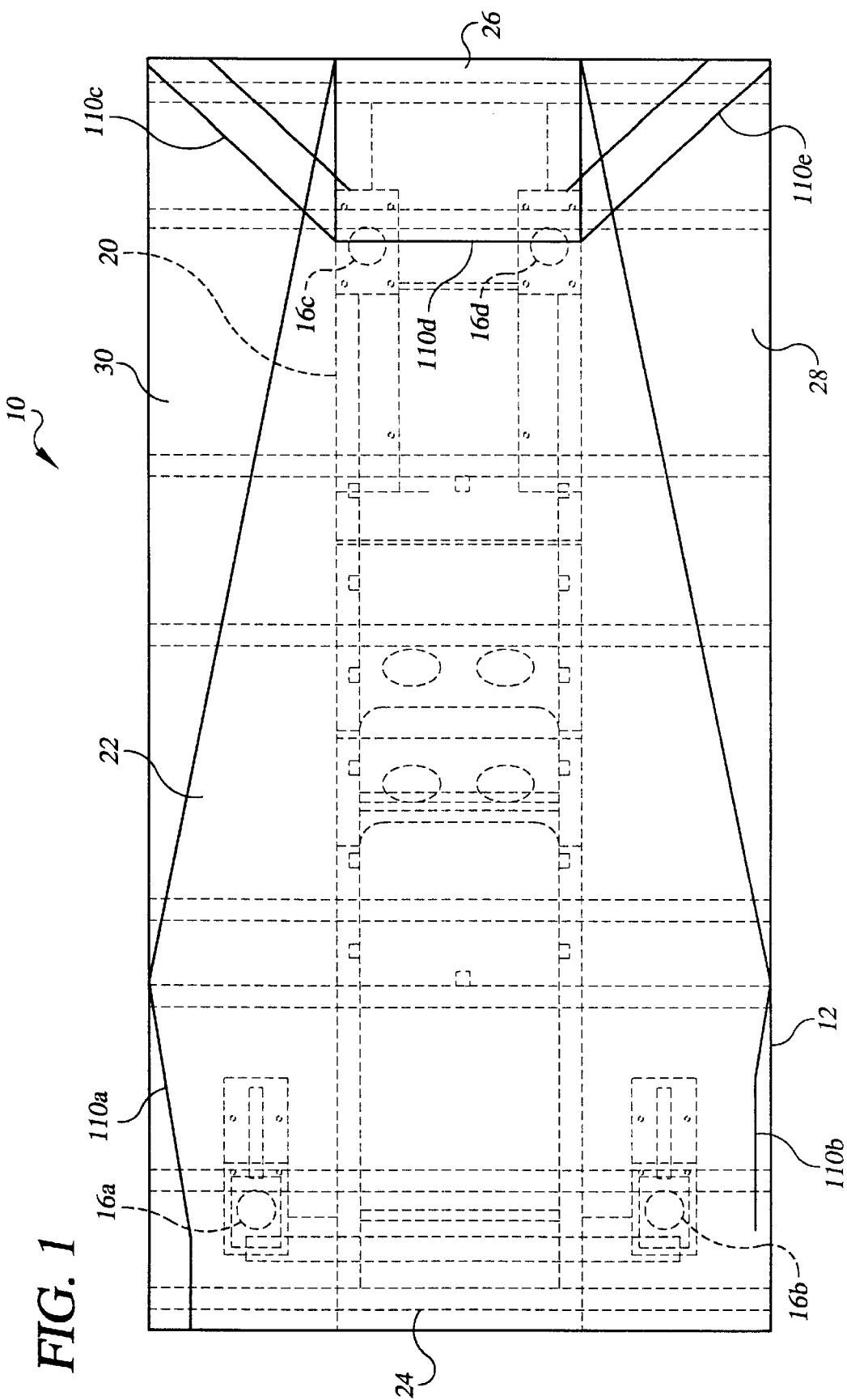
FIG. 1 is a plan view of a vibratory conveyor made in accordance with the present invention.
Figure 2:
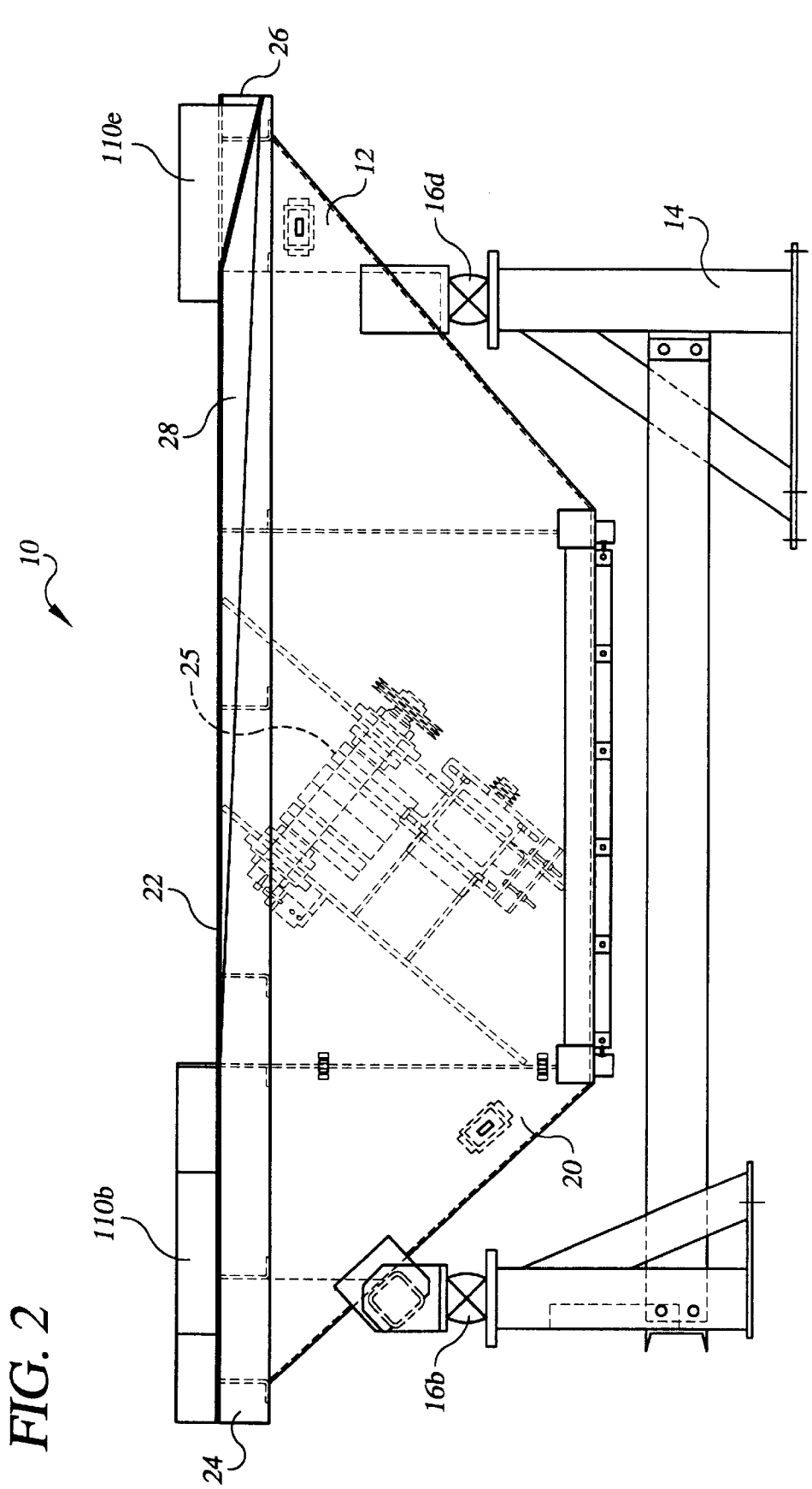
FIG. 2 is a side elevation view of the vibratory conveyor of FIG. 1.
Figure 3:
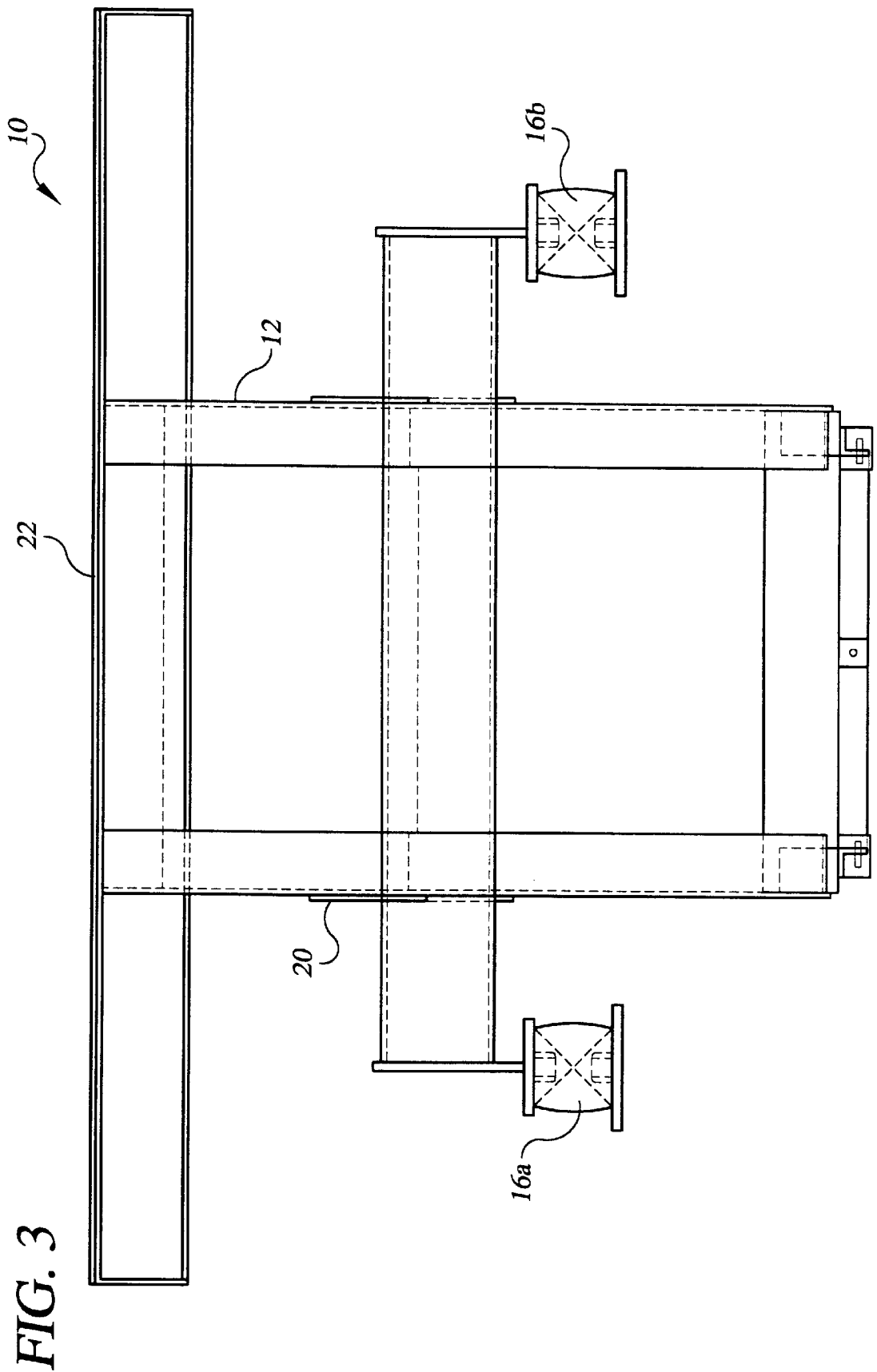
FIG. 3 is a left end view of the vibratory conveyor of FIG. 1, with the stationary base and associated support structure and the vertical diverter plates omitted for clarity.
Figure 4:
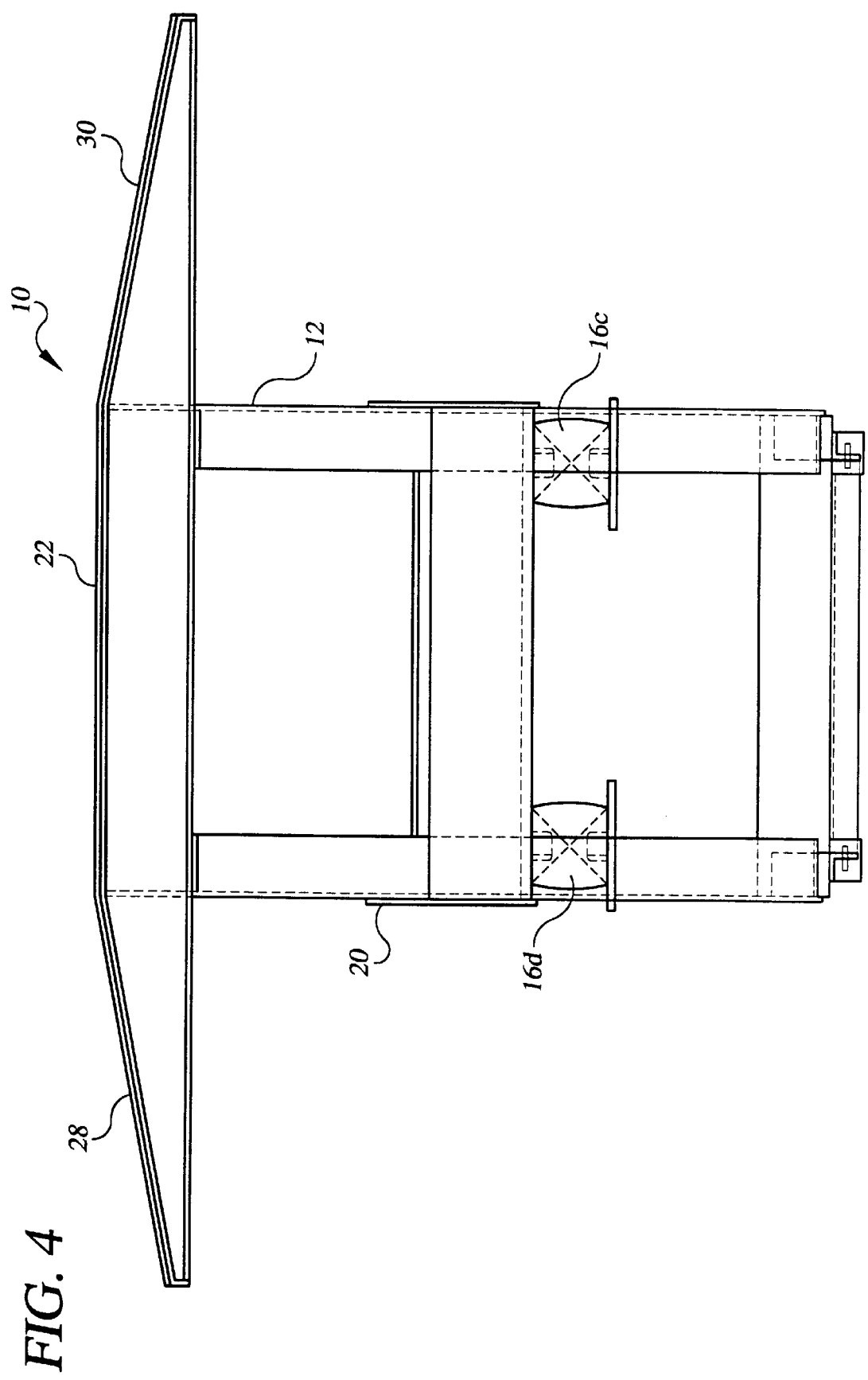
FIG. 4 is a right end view of the vibratory conveyor of FIG. 1, with the stationary base and associated support structure and the vertical diverter plates omitted for clarity.

The present invention is a vibratory conveyor that allows for the distribution of conveyed material at different locations along the length of the conveyor deck, rather than solely at the discharge end, but without the necessity of controlling declination of the conveyor deck. Similar to existing brute force conveyor constructions, the preferred vibratory conveyor is supported on isolation springs and utilizes an eccentric weight drive system for imparting the requisite cyclical force to the deck. In this regard, the eccentric weight drive system preferably comprises a pair of counter-rotating drive shafts carrying identical weights to produce a net force output. However, as will be described in further detail below, the shafts are mounted and controlled so that changing the phase angle between the shafts causes a change in direction, but not magnitude, of the net force output of the drive system, thereby resulting in a directional or sideways conveying motion for the distribution of conveyed material at different locations (and on either side) along the length of the conveyor deck.

FIGS. 1–4 are various views of a preferred vibratory conveyor 10 made in accordance with the present invention. In the preferred embodiment illustrated in FIGS. 1–4, the frame 12 of the conveyor 10 is mounted to, but isolated from, a stationary base 14 by a plurality of isolating springs 16 (although the stationary base and associated support structure is omitted in the views of FIGS. 3 and 4 for clarity). In this particular embodiment, there are four isolating springs 16a, 16b, 16c, 16d, one located at each corner of the conveyor 10. Of course, other known isolation techniques could also be used without departing from the spirit and scope of the present invention.

The frame 12 of the preferred vibratory conveyor 10 comprises a lower housing 20 and an upper deck 22. Specifically, the lower housing 20 is mounted to the stationary base 14 and encloses the eccentric weight drive system 25. The upper deck 22 is a generally horizontal conveying surface that is secured to the lower housing 20. The deck 22 has an inlet end 24 and a discharge end 26. In the preferred embodiment illustrated in FIGS. 1–4, although the deck 22 is oriented in a substantially horizontal plane, the deck 22 is provided with sloped side discharge surfaces 28, 30, the importance of which will be described in further detail below.

Figure 5:
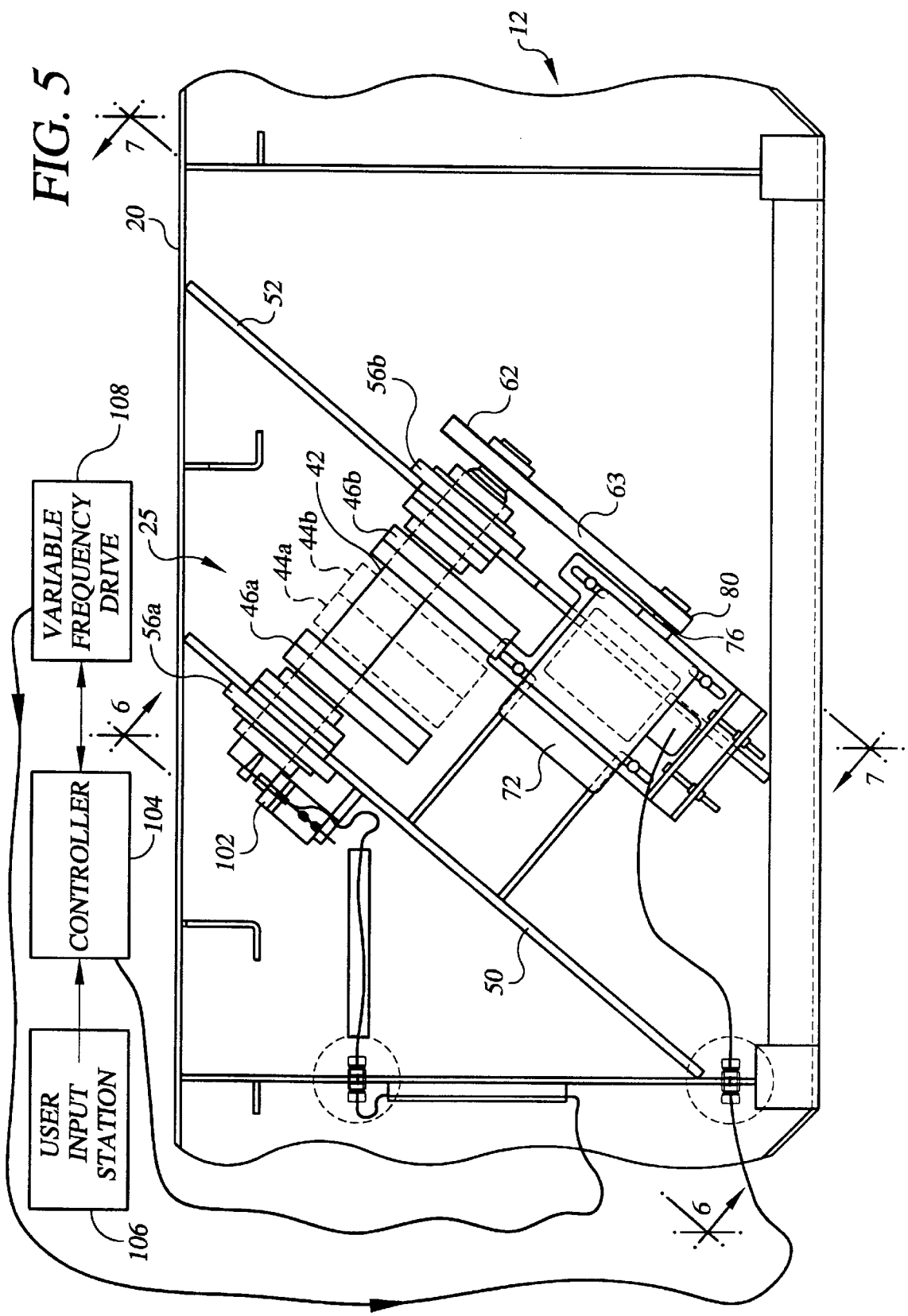
FIG. 5 is a side elevation view of the eccentric shaft drive system of the vibratory conveyor of FIG. 1.
Figure 6:
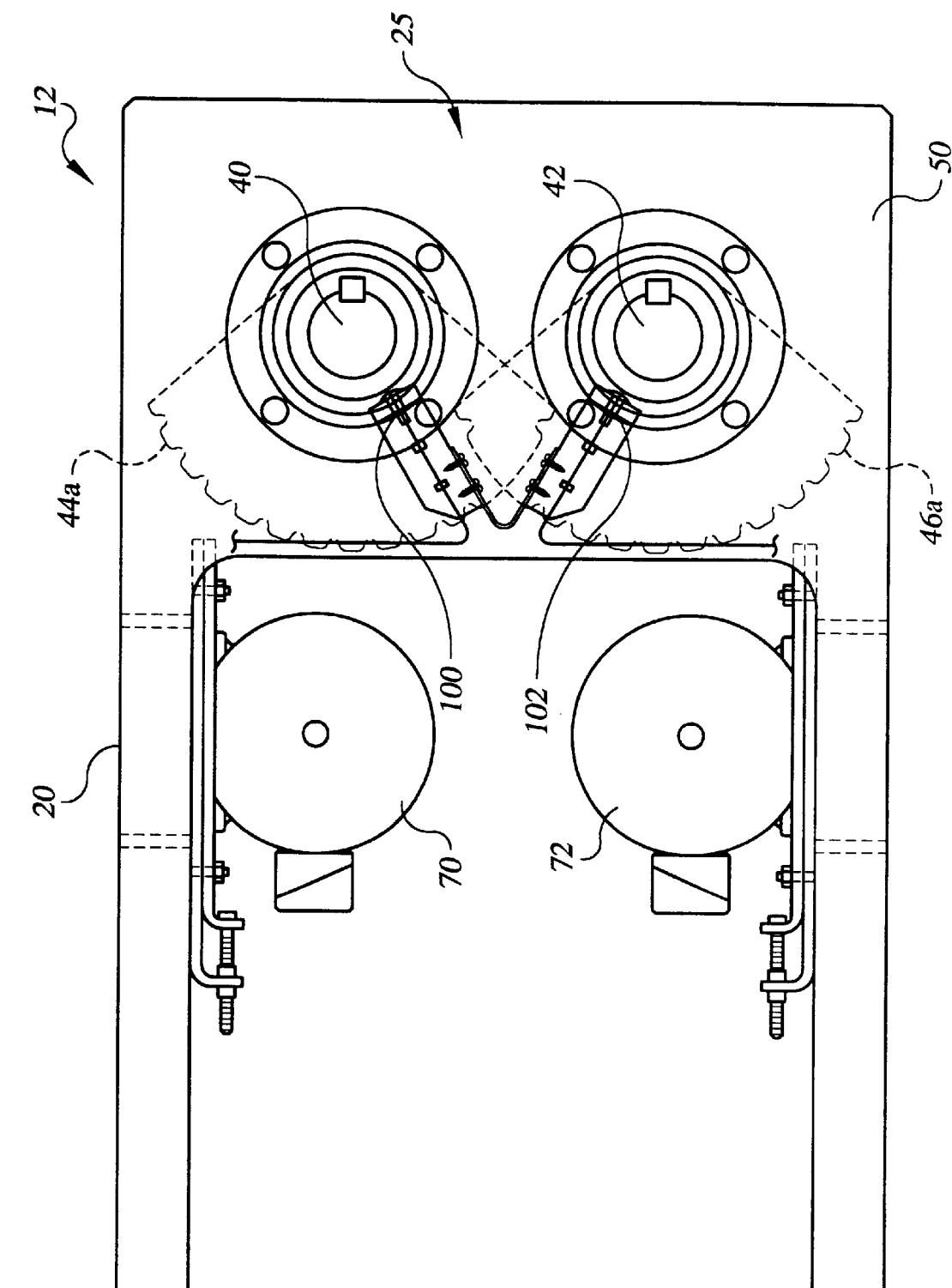
FIG. 6 is an alternate side view of the eccentric shaft drive system of the vibratory conveyor of FIG. 1 taken along line 6—6 of FIG. 5.
Figure 7:
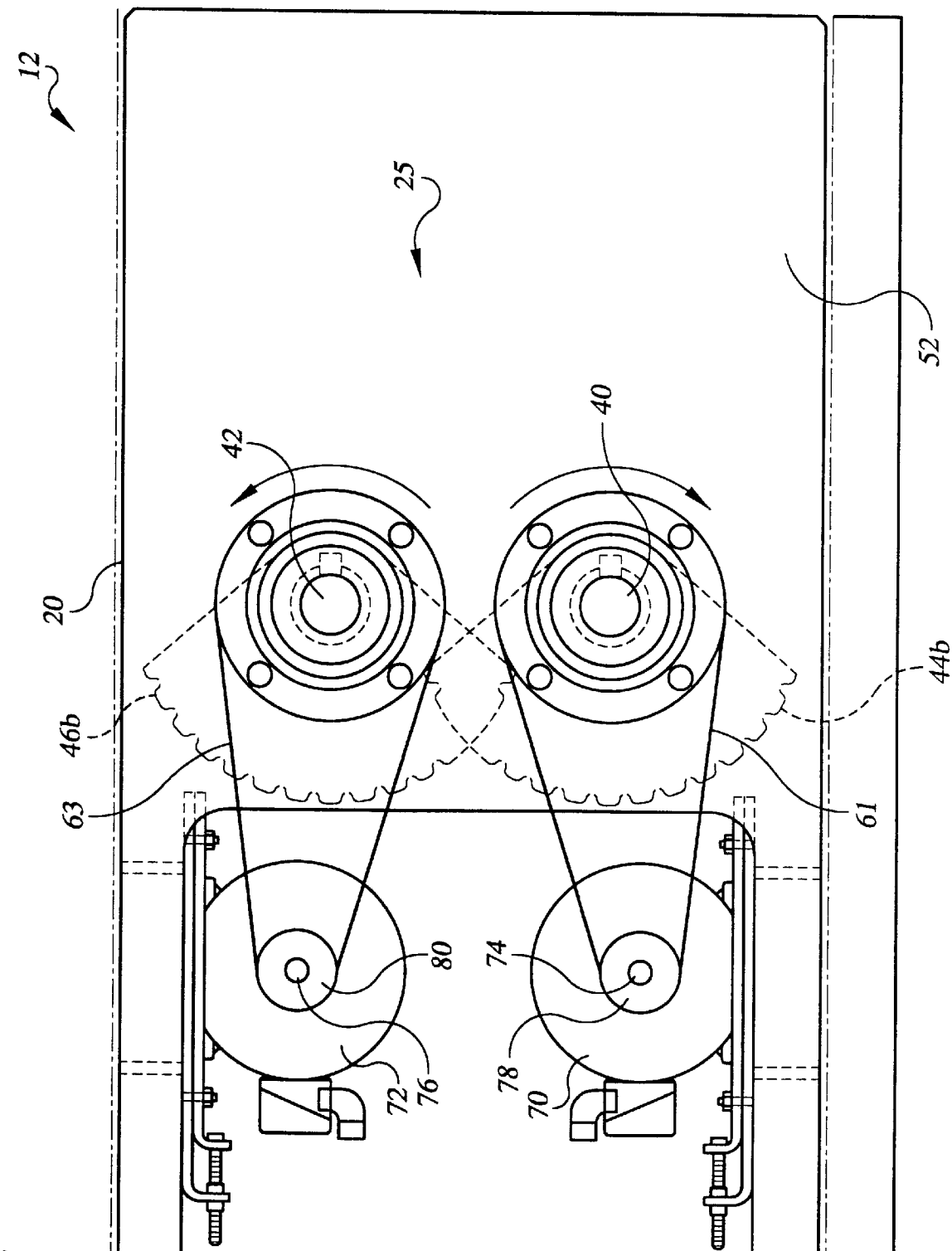
FIG. 7 is an alternate side view of the eccentric shaft drive system of the vibratory conveyor of FIG. 1 taken along line 7—7 of FIG. 5.
Figure 8A:
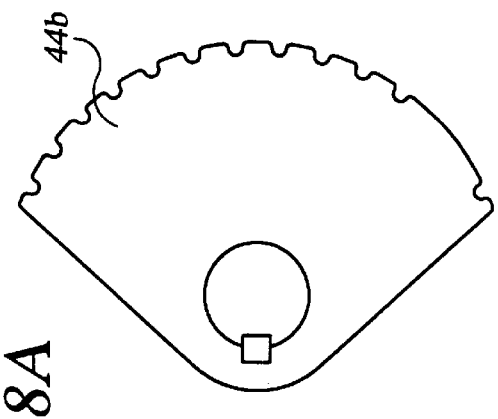
FIG. 8A is a side view of one of the eccentric weights associated with the drive shaft of FIG. 8.
Figure 9A:
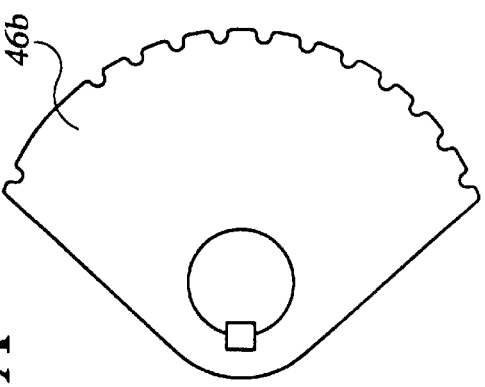
FIG. 9A is a side view of one of the eccentric weights associated with the drive shaft of FIG. 9.
Figure 8:
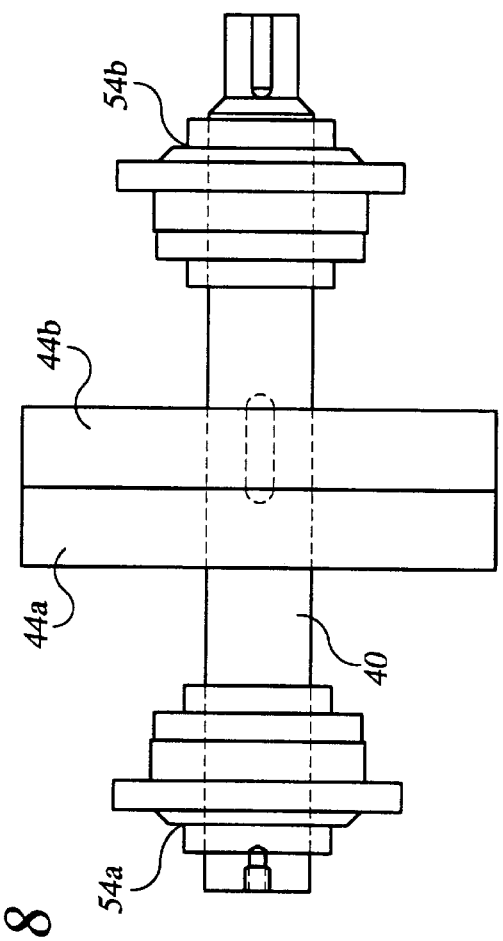
FIG. 8 is a front view of the first shaft of the drive system of the vibratory conveyor of FIG. 1.
Figure 9:
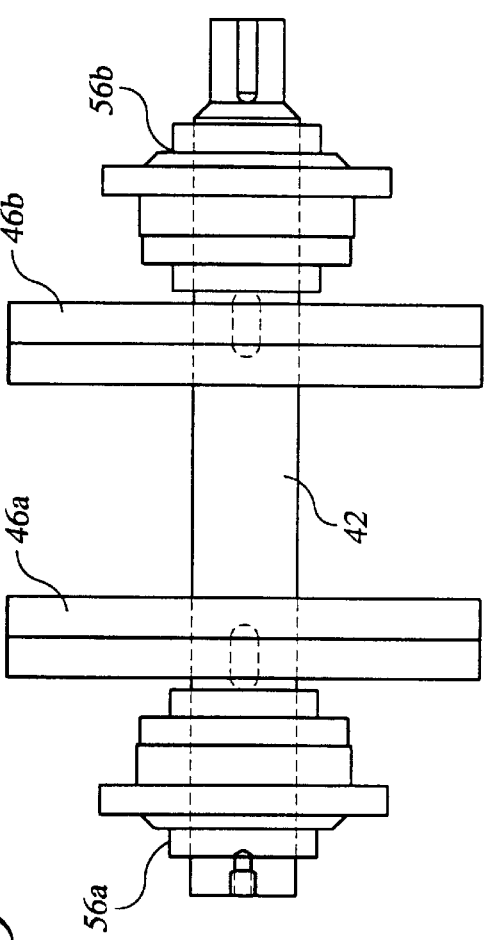
FIG. 9 is a front view of the second shaft of the drive system of the vibratory conveyor of FIG. 1.

FIGS. 5–7 are various views of the preferred eccentric shaft drive system 25. The eccentric shaft drive system 25 includes a pair of counter-rotating drive shafts 40, 42. The first drive shaft 40 carries a pair of eccentric weights 44a, 44b, and the second drive shaft 42 carries a substantially identical pair of eccentric weights 46a, 46b. As best shown in FIGS. 8 and 9, to allow the shafts 40, 42 to counter-rotate in close proximity to one another, the eccentric weights 44a, 44b of the first drive shaft 40 are mounted near the center thereof, while the eccentric weights 46a, 46b of the second drive shaft 42 are mounted near the distal ends thereof. Of course, the eccentric weights can be comprised of a multiplicity of discrete weight elements, but it is preferred that the total eccentric weight carried by the first shaft 40 be substantially the same as the total eccentric weight carried by the second shaft 42.

Referring again to FIGS. 5–7, the eccentric shaft drive system 25 is housed within the lower housing 20 of the frame 12 of the preferred vibratory conveyor 10. In this regard, as illustrated in FIG. 5, the lower housing 20 of the frame 12 includes parallel inner support walls 50, 52 that are welded or similarly secured to the outer walls of the housing 20. The first and second drive shafts 40, 42 are interposed between and rotatably mounted to the inner support walls 50, 52 and supported by respective bearings 54a, 56a, 54b, 56b (e.g., ball bearings or roller bearings), such that the eccentric shaft drive system 25 is mounted at an angle relative to horizontal plane defined by the deck 22. The drive shafts 40, 42 are mounted in parallel relationship with respect to one another, and, as mentioned above, are designed to counter-rotate in close proximity to one another, with the eccentric weights 44a, 44b of the first drive shaft 40 being mounted near the center thereof, and with the eccentric weights 46a, 46b of the second drive shaft 42 being mounted near the distal ends thereof. Each drive shaft 40, 42 also extends through a respective opening defined through the support wall 52 with a drive pulley 60, 62 secured to the distal end of each drive shaft 40, 42, the importance of which is discussed below. As will become clearer in the description that follows, two drive shafts are required for the drive system 25 to function as contemplated, but additional drive shafts could be added to the drive system 25 without departing from the spirit and scope of the present invention.

As shown in FIGS. 5–7, also secured to lower housing 20 of the frame 12, through bolts or similar well-known fasteners, is a pair of motors 70, 72. As best shown in FIG. 7, each motor 70, 72 has an associated shaft 74, 76. A drive pulley 78, 80 is secured to the distal end of each shaft 74, 76 of the respective motors 70, 72 outside of the plane of the support wall 52.

A first belt 61 extends around the drive pulley 60 associated with the first drive shaft 40 and around the drive pulley 78 associated with the motor 70. A second belt 63 extends around the drive pulley associated with the second drive shaft 42 and around the drive pulley 80 associated with the motor 72. As such, when the motors 70, 72 are energized, the rotation of their respective shafts 74, 76 and associated drive pulleys 78, 80 results in the counter-rotation of the respective drive shafts 40, 42 interposed between and rotatably mounted to the support walls 50, 52 within the lower housing 20 of the frame 12 of the vibratory conveyor 10.

The particular mounting details described above represent a preferred mounting of the drive shafts, bearings, motors, and various pulleys. Of course, various means of mounting the drive shafts, bearings, motors, and pulleys of a vibratory conveyor or similar brute force conveyor drive are known in the prior art and could be appropriately implemented for mounting the components of the present invention without departing from the spirit and scope of the present invention.

As mentioned above and described with respect to FIGS. 8 and 9, the first drive shaft 40 carries a pair of eccentric weights 44a, 44b, and the second drive shaft 42 carries a substantially identical pair of eccentric weights 46a, 46b. Thus, counter-rotation of the respective drive shafts 40, 42 and associated eccentric weight elements causes a net force to be imparted to the conveyor deck 22 at an angle relative to horizontal plane defined by the deck 22 to convey material forward. In this particular example, the angle at which the force is imparted relative to horizontal plane defined by the deck 22, the so-called "angle of attack," is 50°.

More importantly, the drive shafts 40, 42 of the preferred vibratory conveyor 10 are mounted and controlled such that changing the phase angle between the respective drive shafts 40, 42 causes a change in direction, but not magnitude, of the net force output of the drive system 25, thereby resulting in a directional or sideways conveying motion.

To accomplish the requisite control of the phase angle relationship between the respective drive shafts 40, 42 requires an appropriate sensing and control system. In general, the variation in phase angle relationship can be accomplished using sensing elements, associated with each of the drive shafts, for generating signals when locating reference points on the rotating drive shafts 40, 42. These signals are communicated to a controller that generates a signal corresponding to the real-time relative phase angle difference between the two drive shafts 40, 42. This signal is then compared to stored data that identifies the predetermined phase angle that would produce a resultant force acting on the conveyor deck 22 in the desired direction. The controller then provides a signal to a motor speed control device (e.g., a variable frequency drive) that, in response to this signal, adjusts the speed of one of the drive shafts 40, 42 (i.e., the slave shaft) while the other drive shaft (i.e., the master shaft) maintains a constant speed until the real-time relative phase angle signal is essentially the same as the predetermined phase angle signal, thereby providing a resultant force to the conveyor deck 22 in the desired direction. U.S. Pat. No. 5,615,763 issued to Schieber describes and claims one such sensing and control system for controlling the phase angle relationship between the respective drive shafts, and is incorporated herein by this reference.

Furthermore, the eccentric shaft drive system 25 illustrated in FIG. 5 includes a schematic representation of the preferred sensing and control system of the present invention. Specifically, a sensor or proximity switch 100, 102 (both shown in FIG. 6) is located adjacent each of the drive shafts 40, 42 for sensing the position of each drive shaft 40, 42. Such proximity switches are well known in the prior art and are readily available from IFM Effector of Exton, Pa. (Part No. IGC-210). Signals representing the respective positions of the drive shafts 40, 42 are generated by the proximity switches 100, 102 and continuously provided to a controller 104, which, in response to the time sequence or value thereof, generates a real-time phase angle signal corresponding to the relative phase angle difference between the two drive shafts 40, 42. The controller 104 then compares the value of the real-time phase angle signal to a predetermined phase angle value representing the desired direction of the resultant force. Such predetermined values corresponding to the actual direction of conveyance have been previously calculated and then programmed into the controller 104 from a user input station 106. The controller 104 then provides a signal to the variable frequency drive 108 to cause it to continuously adjust the speed of one of the motors (i.e., the motor associated with the slave shaft) until the real-time phase angle signal approximates the predetermined, programmed value.

A controller of the type used in the present invention can be obtained from Mitsubishi Electric Corporation of Japan (Part No. FX1N-24MT-ESS/UL). The variable frequency drive may also be obtained from the Mitsubishi Electric Corporation (Part No. FR-A540-3.7K-NA).

Through control of the motors 70, 72 in this manner, the phase angle between the respective drive shafts 40, 42 can be changed, thereby causing a change in direction, but not magnitude, of the net force output of the drive system 25, and resulting in a directional or sideways conveying motion.

To provide further explanation of the directional or sideways conveying motion, reference is made to FIGS. 10–20.

Figure 10:
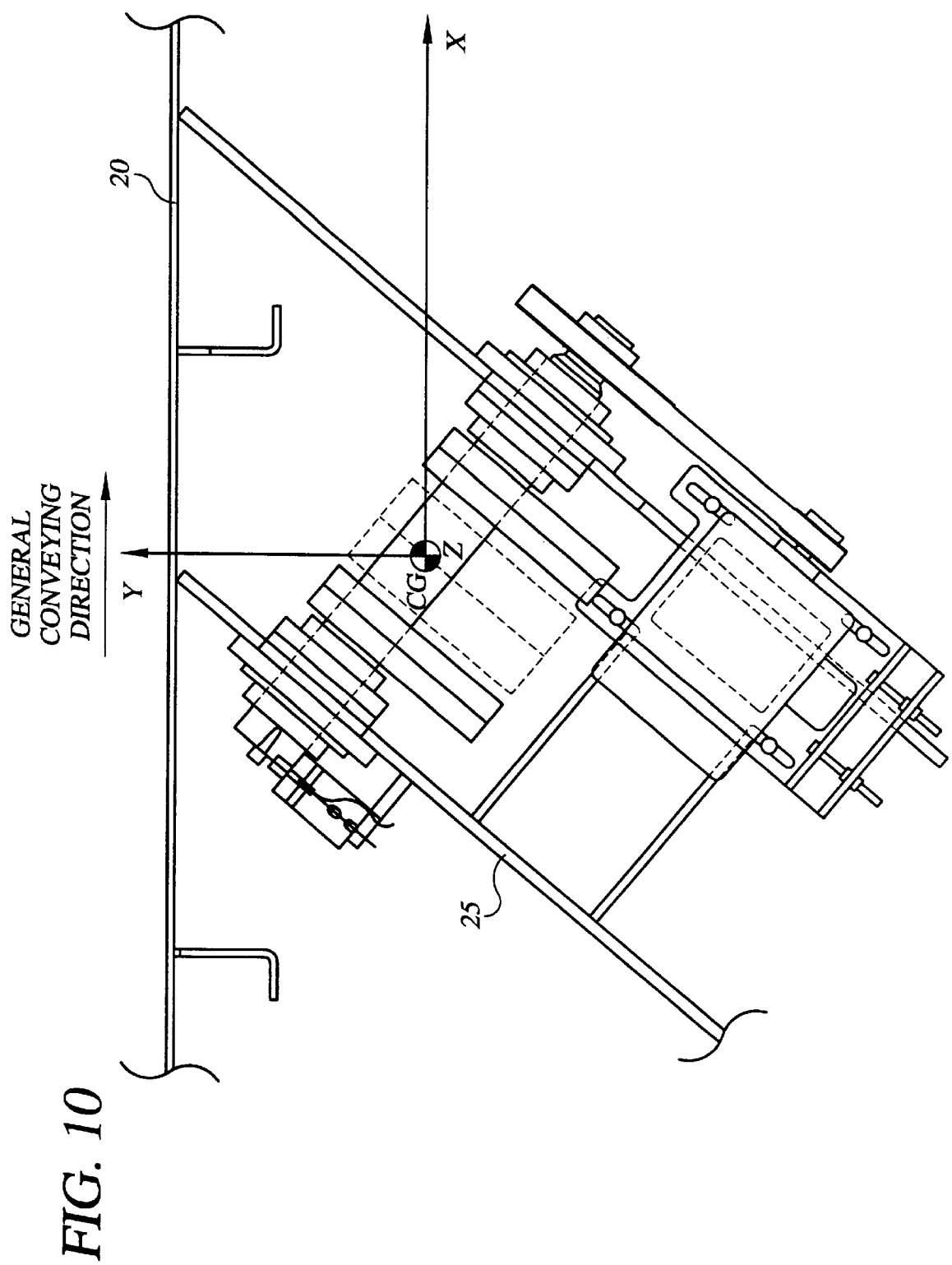
FIG. 10 is an enlarged side elevation view of the eccentric shaft drive system of the vibratory conveyor of FIG. 1, and further defines reference coordinate system.
Figure 11A:
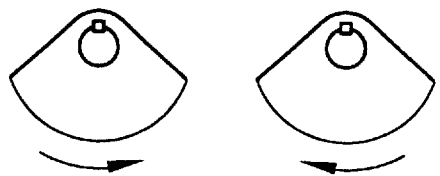
FIGS. 11A–11D depict the relative positions of the eccentric weights of an eccentric drive system with a phase angle of zero at 90-degree intervals through one conveying cycle.
Figure 11B:
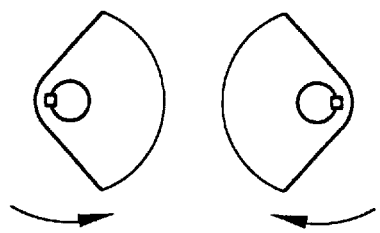
Figure 11C:
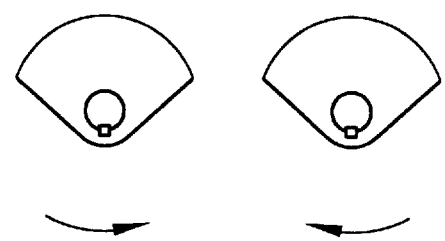
Figure 11D:
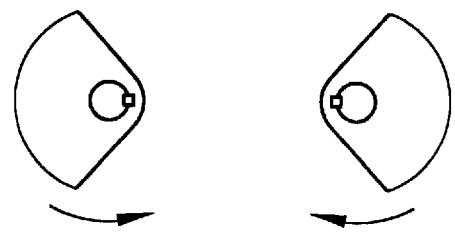

FIG. 10 illustrates that the center of the drive system 25 of the preferred conveyor 10 is at or near the center of gravity (CG) of the conveyor 10. With the center of gravity of the conveyor as a reference point, the horizontal component of the force imparted by the drive system 25 acts along the X-axis (as shown in FIG. 10) and results in a forward conveying motion. The vertical component of the force imparted by the drive system 25 acts along the Y-axis (as shown in FIG. 10), and any directional or sideways conveying motion is along the Z-axis (perpendicular to both the X and Y axes and out of the paper in FIG. 10).

Figure 12:
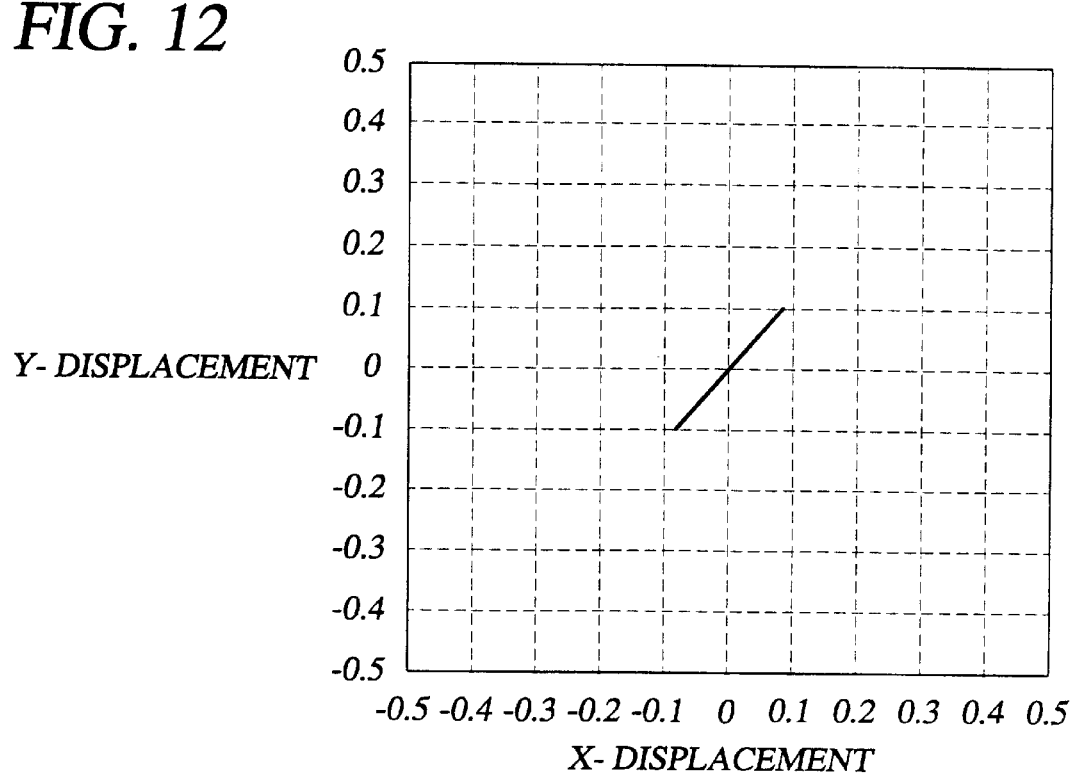
FIG. 12 is a graphical depiction of the stroke pattern in the X-Y plane of an eccentric drive system with a phase angle of zero.
Figure 13:
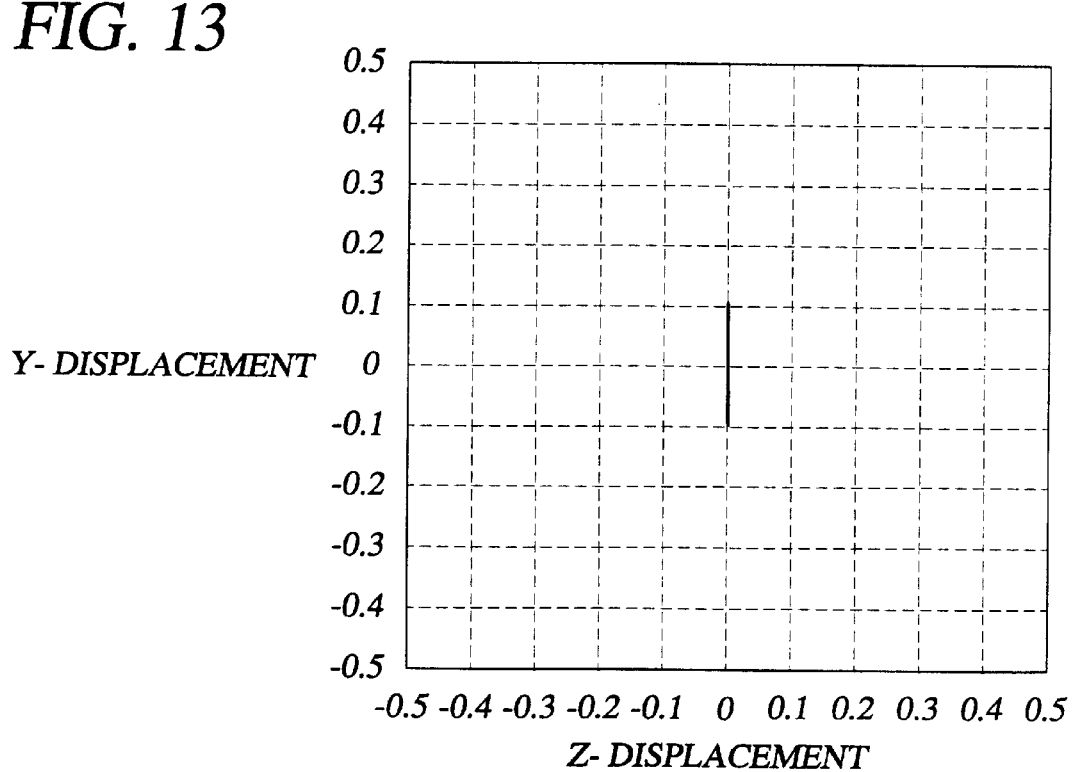
FIG. 13 is a graphical depiction of the stroke pattern in the Y-Z plane of an eccentric drive system with a phase angle of zero.
Figure 14:
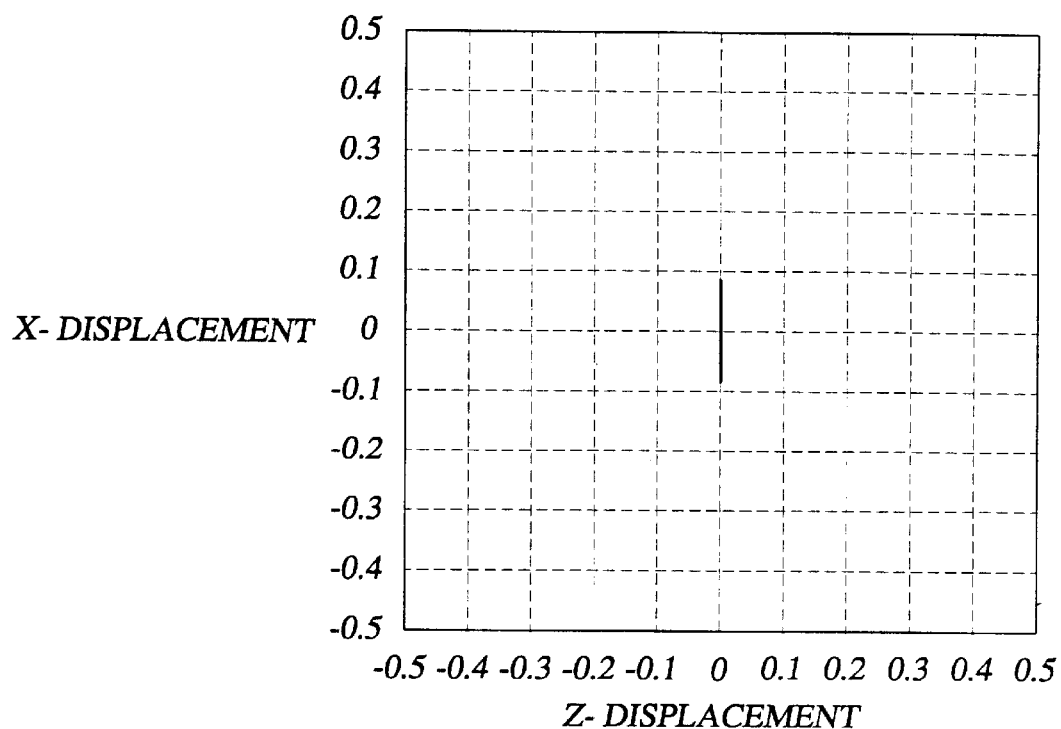
FIG. 14 is a graphical depiction of the stroke pattern in the Z-X plane of an eccentric drive system with a phase angle of zero.
Figure 15:
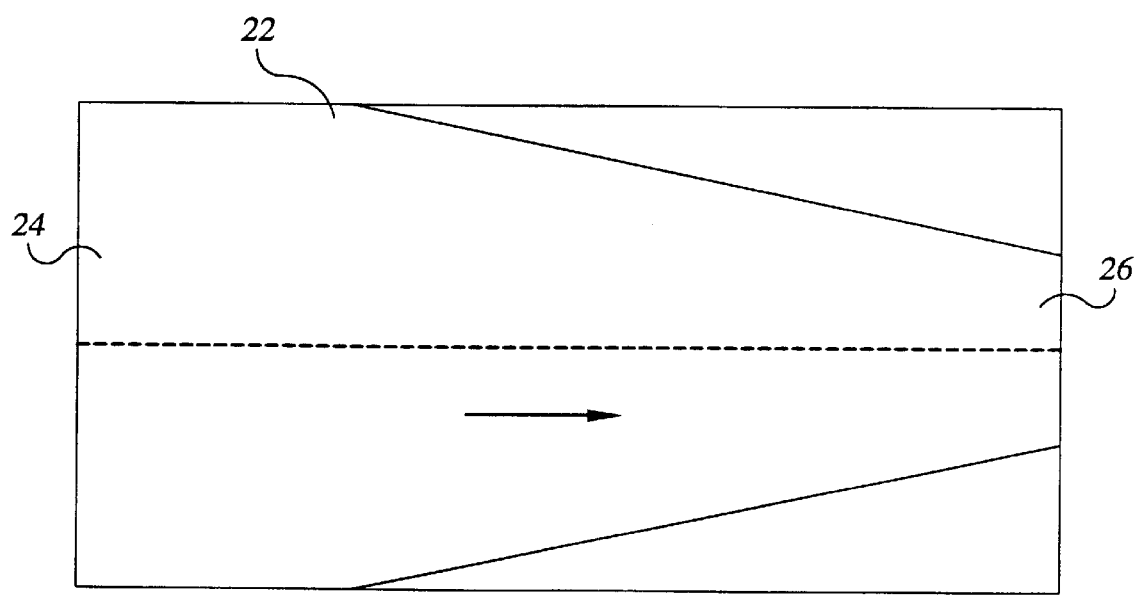
FIG. 15 is a simplified plan view of the conveyor of FIG. 1, illustrating the straight line conveying motion of an eccentric drive system with a phase angle of zero.
Figure 16A:
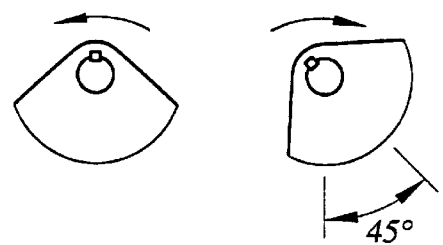
FIGS. 16A–16E depict the relative positions of the eccentric weights of an eccentric drive system with a phase angle of 45° at 22.5-degree intervals through a portion of conveying cycle.
Figure 16B:
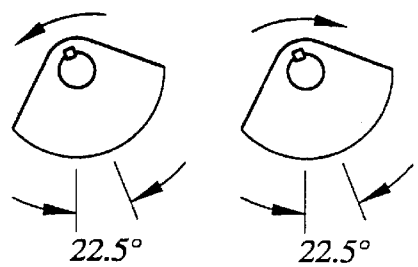
Figure 16C:
Figure 16D:
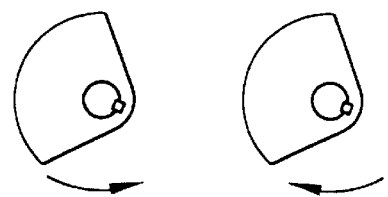
Figure 16E:
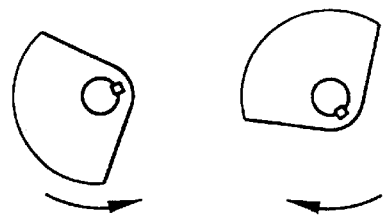

FIGS. 11A–11D depict the relative positions of the eccentric weights of a preferred eccentric drive system with a phase angle of zero at 90-degree intervals through one conveying cycle. FIGS. 12–14 are graphical depictions of the resulting stroke pattern of the preferred eccentric drive system 25 with a phase angle of zero. Referring first to FIG.

12, when the phase angle between the shafts 40, 42 is zero, the stroke pattern has a horizontal component (along the X-axis) and a vertical component (along the Y-axis) which results in the forward conveying motion that is common to brute force conveyors. However, as shown in FIGS. 13 and 14, there is no force component acting along the Z-axis; therefore, conveyed materials move in substantially a straight line from the inlet end 24 to the discharge end 26 of the conveyor 10. This straight line conveying motion is indicated by a dashed line in the simplified plan view of the conveyor in FIG. 15.

As described above, however, in the vibratory conveyor 10 of the present invention, the shafts 40, 42 are controlled so as to allow for a change in the phase angle between the shafts 40, 42. Controlling the phase angle in this manner causes a change in direction, but not magnitude, of the net force output of the drive system 25, resulting in a directional or sideways conveying motion along the Z-axis.

Figure 17:
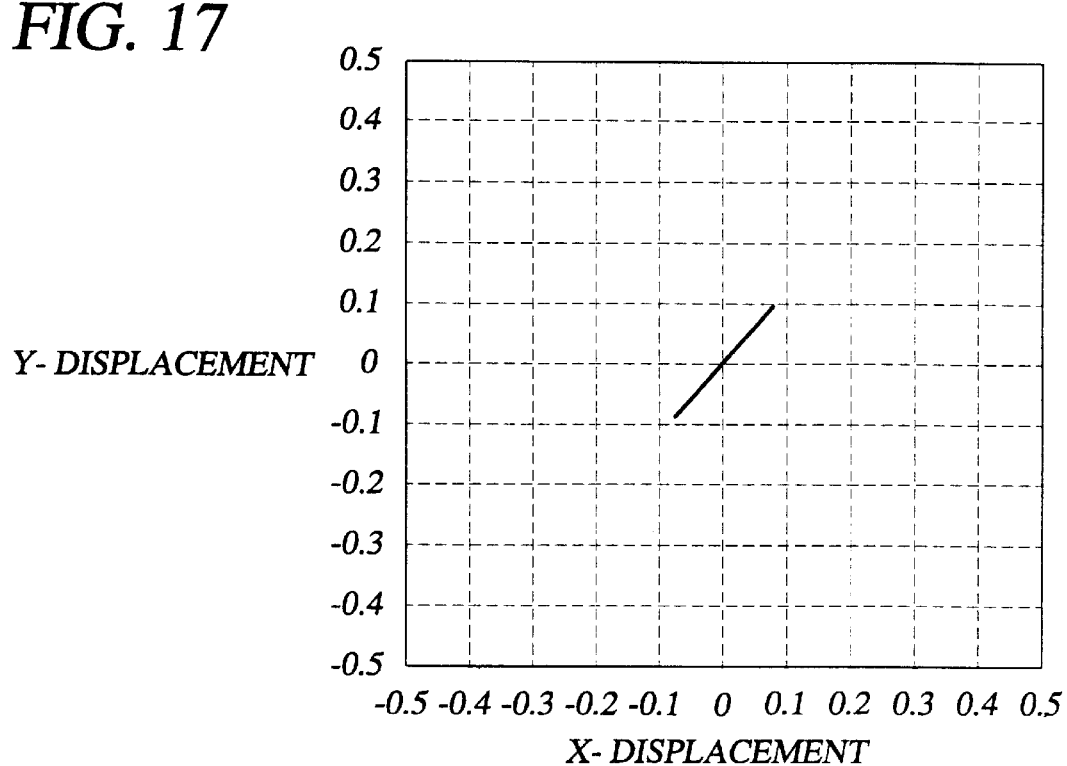
FIG. 17 is a graphical depiction of the stroke pattern in the X-Y plane of an eccentric drive system with a phase angle of 45°.
Figure 18:
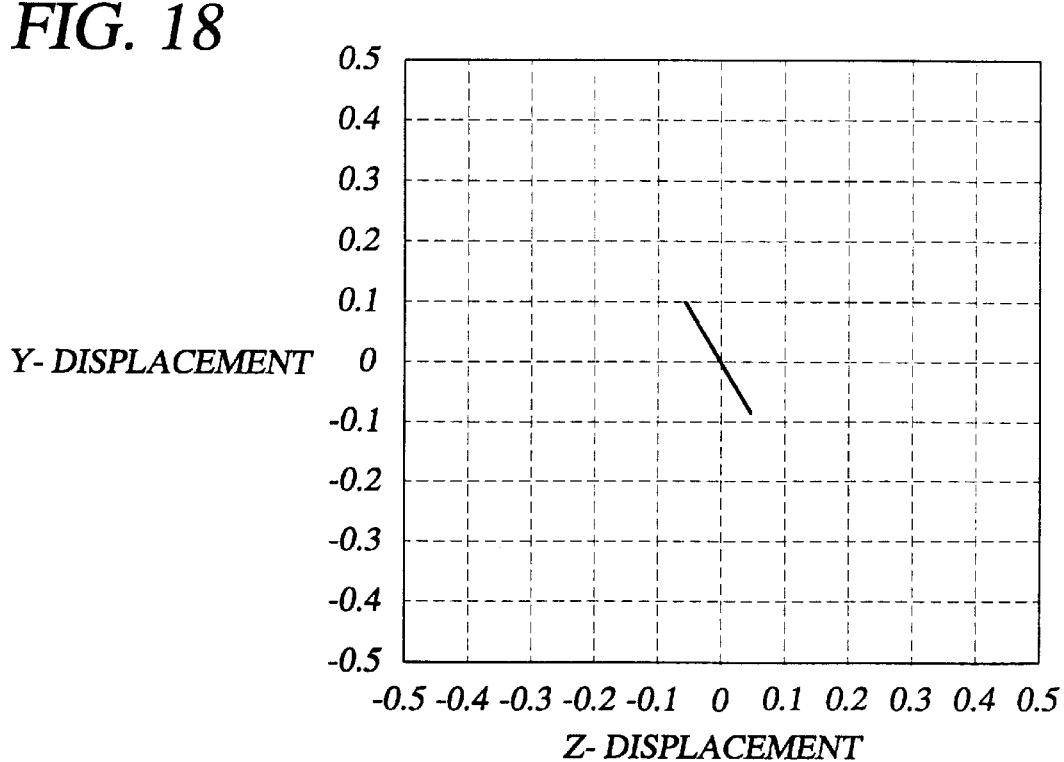
FIG. 18 is a graphical depiction of the stroke pattern in the Y-Z plane of an eccentric drive system with a phase angle of 45°.
Figure 19:
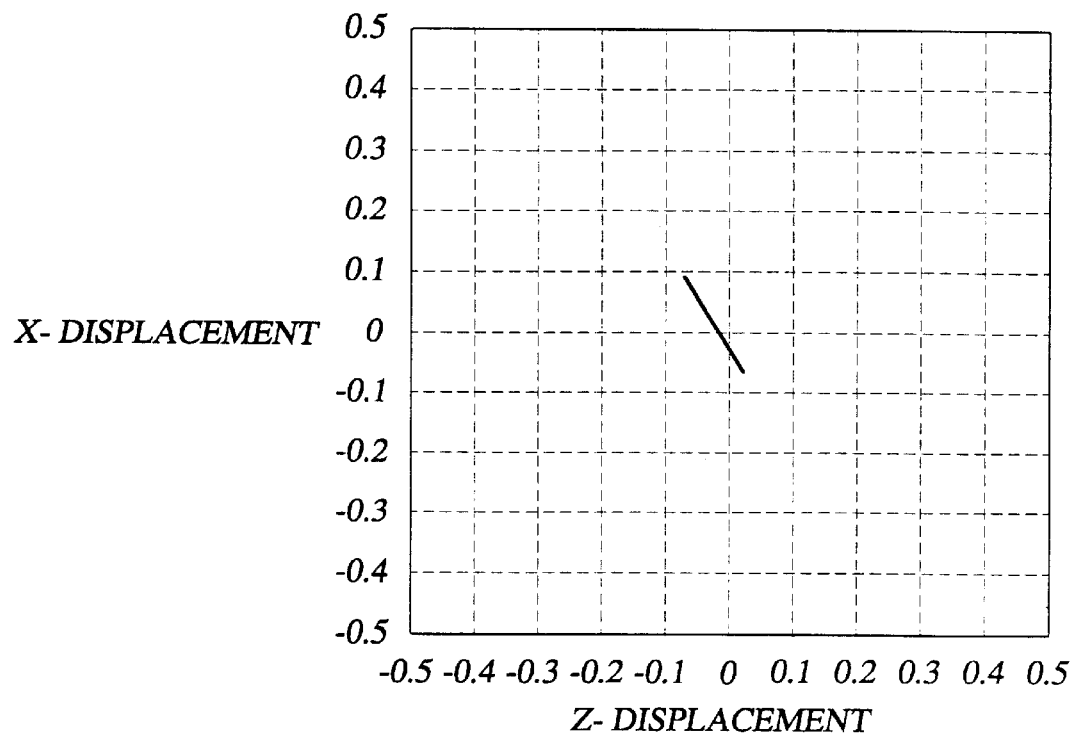
FIG. 19 is a graphical depiction of the stroke pattern in the Z-X plane of an eccentric drive system with a phase angle of 45°.
Figure 20:
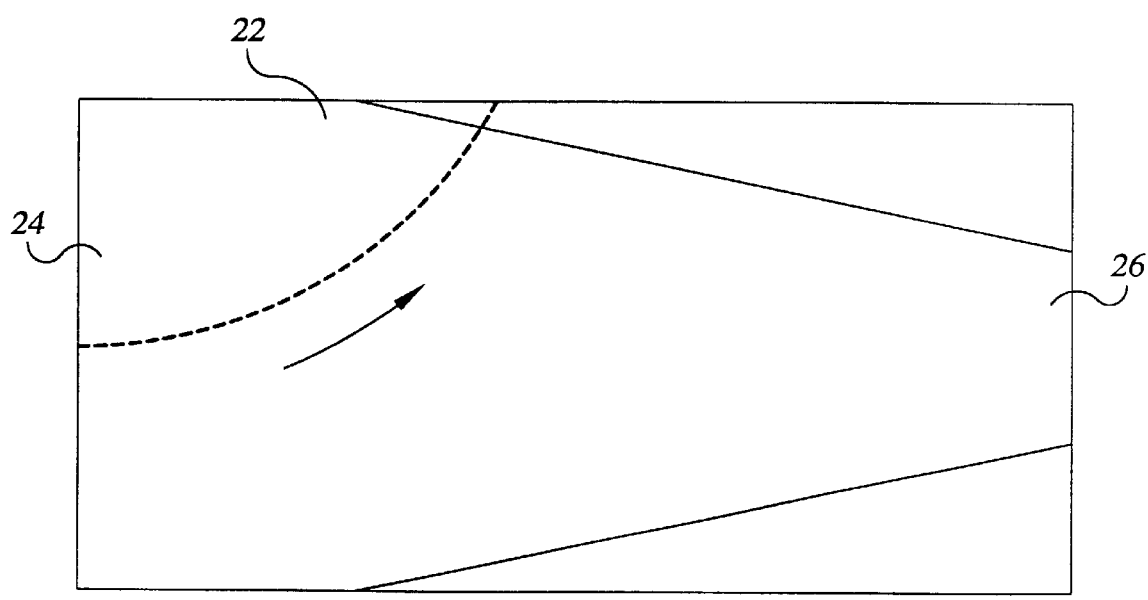
FIG. 20 is a simplified plan view of the conveyor of FIG. 1, illustrating the straight line conveying motion of an eccentric drive system with a phase angle of 45°.

For example, FIGS. 16A–16E depict the relative positions of the eccentric weights of a preferred eccentric drive system 25 with a phase angle of 45° at 22.5-degree intervals through a portion of conveying cycle. FIGS. 17–19 are graphical depictions of the resulting stroke pattern of the preferred eccentric drive system 25 with a phase angle of 45°. Referring first to FIG. 17, when the phase angle between the shafts 40, 42 of the eccentric shaft drive system 25 of the present invention is 45°, the stroke pattern still has a horizontal component (along the X-axis) and a vertical component (along the Y-axis), maintaining the forward conveying motion that is common to brute force conveyors. However, as shown in FIGS. 18 and 19, a force component also acts along the Z-axis, resulting in a sideways conveying motion along the Z-axis. In other words, materials are simultaneously conveyed forward and toward one side of the conveyor deck 22. Although an eccentric shaft drive system 25 with a 45° phase angle is described herein for purposes of example, it is understood that the phase angle is fully adjustable between −180° and +180° without departing from the spirit and scope of the present invention.

In application, the vibratory conveyor 10 of the present invention thus allows for materials to be conveyed forward and distributed along either side of the conveyor deck 22 through control of the phase angle between the shafts 40, 42. For example, a dumpster could be placed on each side of the conveyor 10. Through appropriate programming of the controller 104 (as described with reference to FIG. 5) to control and manipulate the phase angle, the vibratory conveyor 10 could distribute material for a predetermined time period at each of a plurality of identified locations along the distribution edges of the conveyor deck 22. In other words, the conveyor 10 could distribute materials into a first portion of a dumpster on the right side of the conveyor for a specified time period, and then the phase angle could be changed to cause the conveyor 10 to distribute materials into a second portion of a dumpster on the right side of the conveyor for a specified time period, and then the phase angle could again be changed to cause the conveyor 10 to distribute materials into a dumpster on the left side of the conveyor for a specified time period.

Referring again to FIG. 1 and as mentioned above, it is contemplated and preferred that the conveyor deck 22 of the present invention be provided with sloped side discharge surfaces 28, 30. Although the eccentric drive system 25 described above is sufficient to achieve the desired distribution of materials over the side or distribution edges of the conveyor deck 22, by providing sloped side discharge surfaces 28, 30, distribution over the side edges of the deck 22 can be accelerated.

As another refinement, it is also contemplated and preferred that the conveyor deck 22 be provided with vertical diverter plates near the inlet end 24 (as indicated by reference numerals 110a, 110b) and near the discharge end 26 (as indicated by reference numerals 110c, 110d, 110e) which serve to further control the distribution of conveyed materials over the sides of the conveyor deck 22. For example, the diverter plates 110a, 110b near the inlet end 24 ensure that conveyed materials are not prematurely distributed over the side edges of the conveying deck 22. Similarly, the diverter plates 110c, 110d, 110e near the discharge end 26 ensure that materials are not conveyed all the way to the end of the deck 22.

It will be obvious to those skilled in the art that further modifications may be made to the embodiments described herein without departing from the spirit and scope of the present invention.

What is claimed is:

1. A vibratory distribution conveyor, comprising:
   a deck;
   a lower housing secured to said deck and mounted to, but isolated from, a stationary base;
   an eccentric shaft drive system mounted to said lower housing at an angle relative to said deck for imparting a resultant vibratory force to said deck, including at least two drive shafts mounted for rotation relative to said lower housing, each of said shafts being independently driven by a motor, and each said drive shaft carrying weights comprised of one or more eccentric weight elements; and
   a control system for changing the phase angle between said drive shafts to cause a change in direction of the resultant vibratory force imparted by said eccentric shaft drive system and resulting in a sideways conveying motion.

2. A vibratory distribution conveyor as recited in claim 1, in which said control system allows for distribution of conveyed materials along either side of said deck through control of the phase angle between said drive shafts.

3. A vibratory distribution conveyor as recited in claim 1, wherein the two drive shafts of said eccentric shaft drive system counter-rotate with respect to one another, the eccentric weights of one of said drive shafts being mounted near the center thereof, with the eccentric weights of the second of said drive shafts being mounted near the distal ends thereof.

4. A vibratory distribution conveyor as recited in claim 3, wherein one of said drive shafts carries a pair of eccentric weights, and the second of said drive shafts carries a substantially identical pair of eccentric weights.

5. A vibratory distribution conveyor as recited in claim 1, wherein said deck is provided with sloped side discharge surfaces for accelerating distribution of conveyed materials over the sides of the deck.

6. A vibratory distribution conveyor as recited in claim 1, wherein said deck is provided with vertical diverter plates to control the distribution of conveyed materials over the sides of the deck.

7. A vibratory distribution conveyor as recited in claim 1, in which said control system for changing the phase angle between said drive shafts includes:
   a sensor located adjacent each of the drive shafts for sensing the position of each drive shaft;
   a motor speed control device; and
   a controller for receiving signals representing the respective positions of the drive shafts from said sensors, which, in response, generates a real-time phase angle signal corresponding to the relative phase angle difference between the two drive shafts, said controller then providing a signal to the motor speed control device to cause it to continuously adjust the speed of one of said motors until the real-time phase angle signal approximates a predetermined value.

8. A vibratory distribution conveyor as recited in claim 7, in which each sensor of said control system is a proximity switch.

9. A vibratory distribution conveyor as recited in claim 7, in which the motor speed control device of said control system is a variable frequency drive.

10. A vibratory distribution system, comprising:

a deck for carrying articles to be conveyed;

a lower housing secured to said deck and mounted to, but isolated from, a stationary base;

an eccentric shaft drive system mounted to said lower housing at an angle relative to said deck for imparting a resultant vibratory force to said deck, including at least two drive shafts mounted for rotation relative to said lower housing, each of said shafts counter rotating with respect to each other and being independently driven by a motor, each of said shafts carrying eccentric weights; and a control system providing a first resultant vibratory force having a first set of orthogonal force components in X and Y directions, where the X direction is measured along a longitudinal axis of said deck and the Y direction is perpendicular to said deck, thereby providing a motion conveying said articles along said deck in said X direction, and a second resultant vibratory force having a second set of orthogonal force components that additionally include a force component in a Z direction, parallel to said deck but perpendicular to said X and Y directions, thereby providing a motion conveying said article across said deck.

11. A vibratory distribution conveyor as recited in claim 10, wherein the eccentric weights of one of said drive shafts are mounted near the center thereof, and the eccentric weights of the second of said drive shafts are mounted near the distal ends thereof.

12. A vibratory distribution conveyor as recited in claim 11, wherein one of said drive shafts carries a pair of eccentric weights, and the second of said drive shafts carries a substantially identical pair of eccentric weights.

13. A vibratory distribution conveyor as recited in claim 10, wherein said deck is provided with sloped side discharge surfaces for accelerating distribution of conveyed articles over the sides of the deck.

14. A vibratory distribution conveyor as recited in claim 10, wherein said deck is provided with vertical diverter plates to control the distribution of conveyed articles over the sides of the deck.

15. A vibratory distribution conveyor as recited in claim 10, in which said control system includes:

a sensor located adjacent each of the drive shafts for sensing the position of each drive shaft;

a motor speed control device; and a controller for receiving signals representing the respective positions of the drive shafts from said sensors, which, in response, generates a real-time phase angle signal corresponding to the relative phase angle difference between the two drive shafts, said controller then providing a signal to the motor speed control device to cause it to continuously adjust the speed of one of said motors until the real-time phase angle signal approximates a predetermined value.

16. A vibratory distribution conveyor as recited in claim 15, in which each sensor of said control system is a proximity switch.

17. A vibratory distribution conveyor as recited in claim 15, in which the motor speed control device of said control system is a variable frequency drive.

* * * * *

UNITED STATES PATENT AND TRADEMARK OFFICE
CERTIFICATE OF CORRECTION

PATENT NO.   : 6,598,734 B1
DATED        : July 29, 2003
INVENTOR(S)  : Bo Richard Rosenstrom It is certified that error appears in the above-identified patent and that said Letters Patent is hereby corrected as shown below:

<u>Column 9,</u>
Line 12, remove the number "10" from between "speed" and "control".

Signed and Sealed this

Eleventh Day of November, 2003

JAMES E. ROGAN
*Director of the United States Patent and Trademark Office*